United States Patent
Fujita

(10) Patent No.: US 11,979,802 B2
(45) Date of Patent: May 7, 2024

(54) BASE STATION, TRANSPORT COMMUNICATION SYSTEM, AND METHOD

(71) Applicant: KYOCERA Corporation, Kyoto (JP)

(72) Inventor: Hiroki Fujita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 295 days.

(21) Appl. No.: 17/227,301

(22) Filed: Apr. 10, 2021

(65) Prior Publication Data
US 2021/0235241 A1   Jul. 29, 2021

Related U.S. Application Data

(63) Continuation of application No. PCT/JP2019/039496, filed on Oct. 7, 2019.

(30) Foreign Application Priority Data

Oct. 12, 2018 (JP) ................. 2018-193865

(51) Int. Cl.
| | | |
|---|---|---|
| *H04W 4/44* | (2018.01) | |
| *G08G 1/01* | (2006.01) | |
| *G08G 1/0967* | (2006.01) | |
| *H04W 72/56* | (2023.01) | |
| *H04W 76/16* | (2018.01) | |

(52) U.S. Cl.
CPC ............ *H04W 4/44* (2018.02); *G08G 1/0116* (2013.01); *H04W 72/56* (2023.01); *H04W 76/16* (2018.02); *G08G 1/096783* (2013.01)

(58) Field of Classification Search
CPC ......... H04W 4/44; H04W 76/16; H04W 2/56; G08G 1/0116; G08G 1/096783
See application file for complete search history.

(56) References Cited

U.S. PATENT DOCUMENTS

| | | | | |
|---|---|---|---|---|
| 10,354,523 | B2* | 7/2019 | Jin | ............ G08G 1/0133 |
| 10,559,198 | B1* | 2/2020 | Price | ............ G08G 1/04 |
| 10,567,771 | B2* | 2/2020 | Mishra | ............ H04N 19/20 |
| 10,672,270 | B2* | 6/2020 | Kim | ............ G08G 1/166 |
| 2012/0146814 | A1* | 6/2012 | Kim | ............ G08G 1/096783 |
| | | | | 340/929 |

(Continued)

FOREIGN PATENT DOCUMENTS

| | | |
|---|---|---|
| JP | 2002-163285 A | 6/2002 |
| JP | 2006-293696 A | 10/2006 |

(Continued)

OTHER PUBLICATIONS

ARIB STD-T109 1.3 version; "700 MHz Band Intelligent Transport Systems"; Association of Radio Industries and Businesses; Jul. 27, 2017; total 245 pages; Japan.

*Primary Examiner* — Azizul Choudhury
(74) *Attorney, Agent, or Firm* — Studebaker & Brackett PC

(57) ABSTRACT

A roadside device 200, which performs radio communication with a mobile station on a road, includes: a first communicator 210 available for a first radio communication scheme; a second communicator available 220 for a second radio communication scheme different from the first radio communication scheme; and a controller configured to acquire, from the first mobile station via the first communicator 210, information associated with a first mobile station and distribute the acquired information to a second mobile station via the second communicator 220.

14 Claims, 5 Drawing Sheets

(56) References Cited

U.S. PATENT DOCUMENTS

| | | | |
|---|---|---|---|
| 2013/0095845 A1* | 4/2013 | Lim | H04W 36/0066 |
| | | | 455/452.2 |
| 2017/0092126 A1 | 3/2017 | Oshida et al. | |
| 2021/0286041 A1* | 9/2021 | Jiang | G01S 5/10 |

FOREIGN PATENT DOCUMENTS

| | | |
|---|---|---|
| JP | 2013-009027 A | 1/2013 |
| JP | 2014-230191 A | 12/2014 |
| JP | 2017-068335 A | 4/2017 |

\* cited by examiner

FIG. 4

| DISTRIBUTION INFORMATION / DELIVERY DESTINATION | LOW-RISK PEDESTRIAN INFORMATION (PEDESTRIANS AT SHORT RANGE) | HIGH-RISK PEDESTRIAN INFORMATION (PEDESTRIANS AT LONG RANGE) | HIGH-RISK VEHICLE INFORMATION (VEHICLES AT SHORT RANGE OR VEHICLES MOVING AT HIGH SPEED) | LOW-RISK VEHICLE INFORMATION (VEHICLES AT LONG RANGE, PARKED VEHICLES OR THE LIKE) | DYNAMIC ROAD INFORMATION (SIGNAL INFORMATION OR THE LIKE) | QUASI-DYNAMIC ROAD INFORMATION (CONSTRUCTION INFORMATION OR THE LIKE) | STATIC ROAD INFORMATION (ROAD SHAPES OR THE LIKE) |
|---|---|---|---|---|---|---|---|
| PEDESTRIAN COMMUNICATION SCHEME (BLE) | RANK 4 | RANK 5 | RANK 1 | RANK 2 | RANK 3 | RANK 6 | RANK 7 |
| VEHICLE COMMUNICATION SCHEME (T109) | RANK 4 | RANK 1 | RANK 2 | RANK 5 | RANK 3 | RANK 6 | RANK 7 |
| WIDE AREA COMMUNICATION SCHEME (LTE) | RANK 7 | RANK 6 | RANK 4 | RANK 5 | RANK 2 | RANK 1 | RANK 3 |

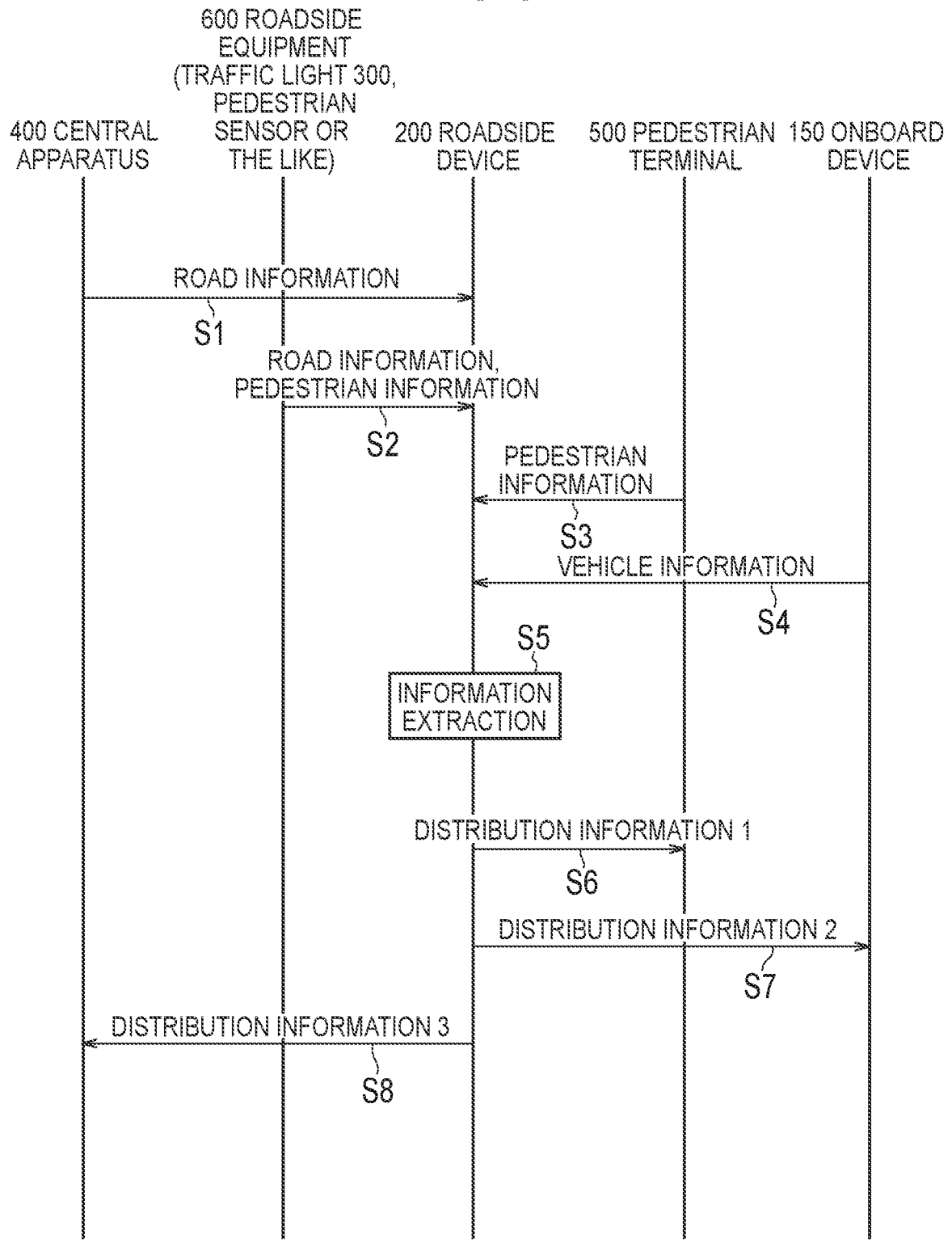

BASE STATION, TRANSPORT COMMUNICATION SYSTEM, AND METHOD

RELATED APPLICATIONS

The present application is a continuation based on PCT Application No. PCT/JP2019/039496, filed on Oct. 7, 2019, which claims the benefit of Japanese Patent Application No. 2018-193865 filed on Oct. 12, 2018. The content of which is incorporated by reference herein in their entirety.

TECHNICAL FIELD

The present invention relates to a base station, a traffic communication system, and a method.

BACKGROUND ART

In recent years, intelligent traffic systems (ITS) have attracted attention as a technology that assists in preventing the risk of traffic accidents.

In order to achieve such systems, Non Patent Literature 1 specifies a radio communication scheme for road-to-vehicle communication and vehicle-to-vehicle communication. The road-to-vehicle communication represents radio communication performed between a roadside device or a base station installed on a roadside and an onboard device or a mobile station mounted on a vehicle. The vehicle-to-vehicle communication represents radio communication between onboard devices.

CITATION LIST

Non Patent Literature

Non Patent Literature 1: ARIB STD-T109 1.3 version "700 MHz band intelligent traffic system"

SUMMARY

A base station according to a first embodiment configured to perform radio communication with a mobile station on a road. The base station includes: a first communicator available for a first radio communication scheme; a second communicator available for a second radio communication scheme different from the first radio communication scheme; and a controller configured to acquire, from the first mobile station via the first communicator, information associated with a first mobile station and distribute the acquired information to a second mobile station via the second communicator.

A traffic communication system according to a second embodiment includes the base station according to the first embodiment.

A method according to a third embodiment is a method for controlling a base station which performs radio communication with a mobile station on a road in a traffic communication system. The method includes: acquiring, from the first mobile station using a first radio communication scheme, information associated with a first mobile station; and distributing the acquired information to a second mobile station using a second radio communication scheme different from the first radio communication scheme.

BRIEF DESCRIPTION OF DRAWINGS

FIG. 4 illustrates an example of an information distribution priority ranking table according to the embodiment.

FIG. 5 illustrates an overall operation example of the traffic communication system according to the embodiment.

DESCRIPTION OF EMBODIMENTS

According to the radio communication scheme disclosed in Non Patent Literature 1, the prevention of traffic accidents between vehicles is assisted by direct transmission or reception of information by the vehicle-to-vehicle communication.

However, the radio communication scheme disclosed in Non Patent Literature 1 is not oriented to radio communication between an onboard device and a pedestrian terminal or a mobile station that moves together with a pedestrian and cannot transmit or receive information between the pedestrian terminal and the onboard device.

Accordingly, the prevention of traffic accidents between pedestrians and vehicles is not sufficiently assisted, which leaves room for improvement in further reduction of traffic accidents.

An object of the present invention is to provide a base station, a traffic communication system, and a method that further reduce traffic accidents.

It will be described with reference to the drawings about a traffic radio communication system according to an embodiment. Further, in the following description of the drawings, same or similar parts are marked with same or similar signs.

(System Configuration)

Figure 1:
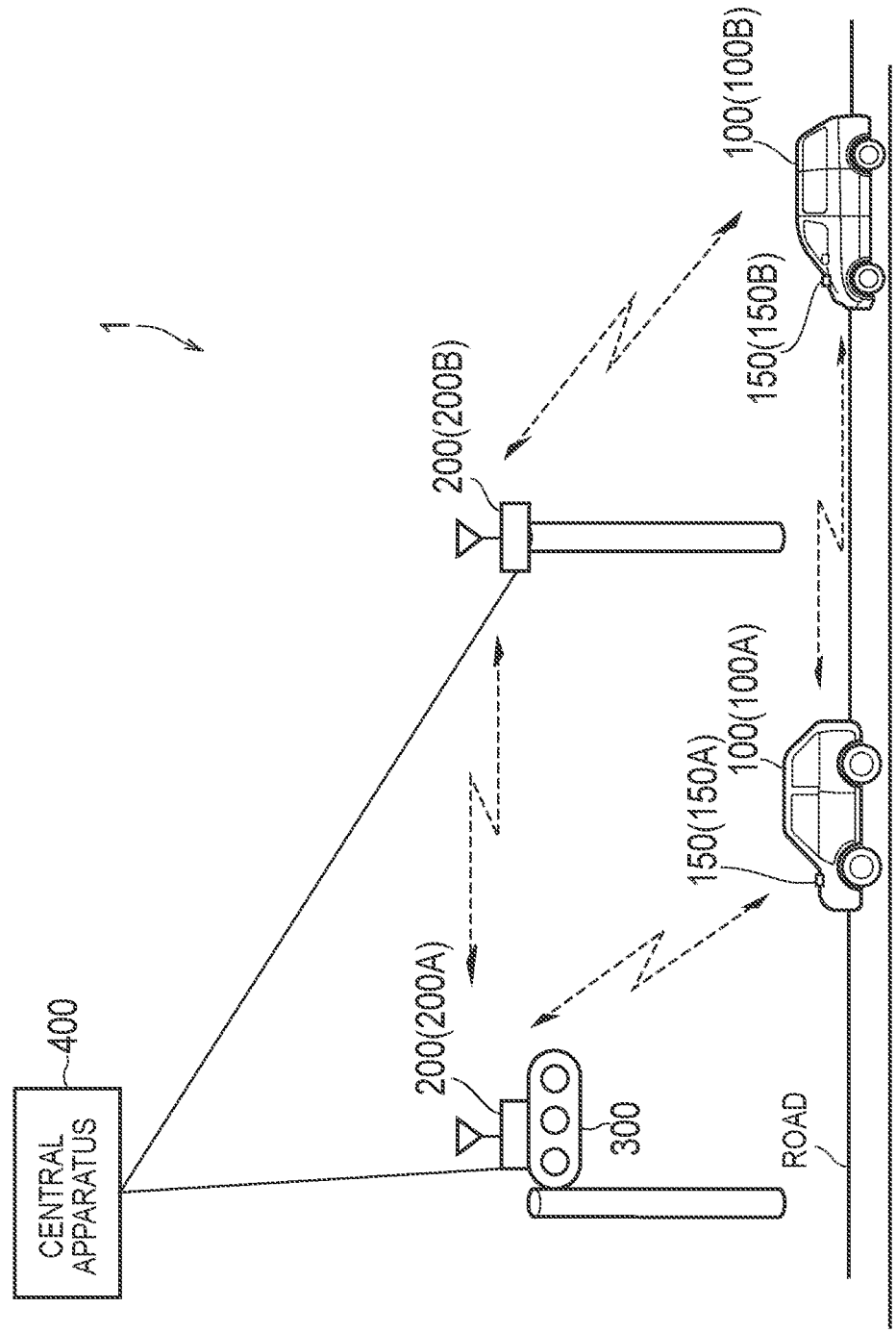
FIG. 1 illustrates an example of overall architecture of a traffic communication system according to an embodiment.

FIG. 1 is a diagram illustrating an overall configuration example of a traffic radio communication system 1 according to a present embodiment.

As illustrated in FIG. 1, the traffic radio communication system 1 includes a plurality of vehicles 100, and a plurality of roadside devices 200. In FIG. 1, vehicles 100A and 100B are exemplified as the plurality of vehicles 100 and roadside devices 200A and 200B are exemplified as the plurality of roadside devices 200. Each of vehicles 100 is provided with onboard device 150 as a mobile station which performs a radio communication with the roadside device 200.

Each of the roadside devices 200 is provided near a road. The roadside device 200 may be provided on every intersection of a general road or provided at roadside of highway for example. Note that a road (the general road) is a concept including a sidewalk.

The traffic radio communication system 1 performs road-to-vehicle communication which is a radio communication between the roadside device 200 and the vehicle 100. The traffic radio communication system 1 may perform inter-vehicle communication which is a radio communication between the vehicles 100, and/or road-road communication which is a radio communication between the roadside devices 200. Schemes of these radio communications may be a radio communication scheme confirming to a standard specification (ARIB STD-T109) which is described in Non Patent Literature 1.

According to the present embodiment, the traffic communication system 1 further performs radio communication between each roadside device 200 and a terminal used by a pedestrian (hereinafter referred to as "pedestrian terminal").

In other words, each roadside device 200 not only performs radio communication with each vehicle 100 but also performs radio communication with the pedestrian terminal. The pedestrian terminal may be any mobile station that moves together with the pedestrian such as smartphone, tablet terminal, and wearable terminal (for example, a smart watch).

Hereinafter, the radio communication with the vehicles 100 performed by the roadside devices 200 is referred to as "vehicle communication," and the radio communication with the pedestrian terminal performed by the roadside devices 200 is referred to as "pedestrian communication." According to the present embodiment, a radio communication scheme for the vehicle communication and a radio communication scheme for the pedestrian communication are different from each other. Accordingly, the roadside devices 200 are available for a plurality of radio communication schemes.

Examples of the radio communication scheme for the vehicle communication include ARIB STD-T109, dedicated short range communications (DSRC), or cellular vehicle-to-everything (C-V2X) that conforms to the third generation partnership project (3GPP). On the other hand, examples of the radio communication scheme for the pedestrian communication include Bluetooth (registered trademark) and wireless local area network (WLAN).

In FIG. 1, the vehicles 100 are illustrated as a standard-sized automobile and a light automobile, but each vehicle 100 may be any vehicle such as bus, motorcycle, or bicycle as long as it travels along a road. A bicycle equipped with an onboard device 150 may be classified as a vehicle. In a case where a bicycle rider holds a terminal, the bicycle may be classified as a pedestrian terminal. As described above, the traffic communication system 1 may perform radio communication not only between each roadside device 200 and a pedestrian but also between each roadside device 200 and a terminal used by a moving person (hereinafter referred to as "moving person terminal"). Examples of the moving person include a bicycle rider as described above or a person who travels by other modes of traffic. Each roadside device 200 may determine whether the communications partner is a moving person terminal according to a signal by the radio communication scheme received from the moving person terminal or information contained in the signal. Hereinafter, a pedestrian terminal will be described as an example of the moving person terminal.

In FIG. 1, the roadside device 200A is installed on a traffic light 300 or on the support pillar thereof and operates in cooperation with the traffic light 300. The roadside device 200A may transmit information associated with the traffic light 300 (such as information for switching light colors) to the vehicles 100 by the vehicle communication.

Each roadside device 200 may be connected to a central apparatus 400 via a network (communication line). Each roadside device 200 may perform radio communication with a network in order to communicate with the central apparatus 400.

From each roadside device 200, the central apparatus 400 may receive vehicle information including, for example, the positions and travelling speeds of the vehicles 100 which are transmitted to the roadside devices 200 from the vehicles 100. The central apparatus 400 may further receive road information from roadside sensors installed on each road. The central apparatus 400 may collect and integrate various kinds of road information based on the received information so as to control the traffic communication system 1. To the roadside devices 200, the central apparatus 400 transmits, for example, a control command instructing the traffic light 300 to switch light colors or road information including congestion information.

Figure 2:
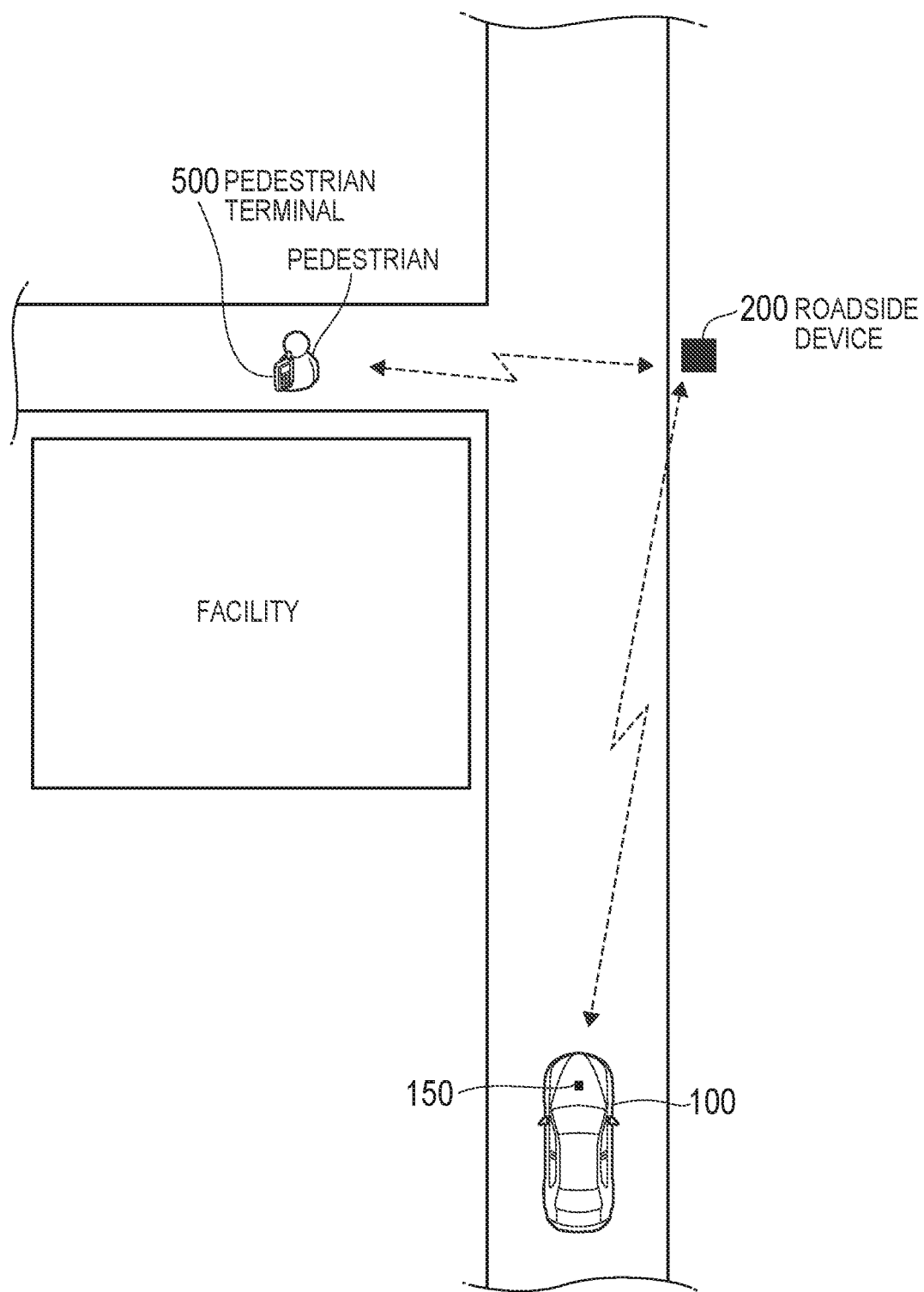
FIG. 2 illustrates an example of an operating environment of the traffic communication system according to the embodiment.

FIG. 2 illustrates an example of an operating environment of the traffic communication system 1 according to this embodiment.

As illustrated in FIG. 2, the roadside device 200 installed at an intersection performs radio communication with the vehicle 100 (onboard device 150) and with a pedestrian terminal 500. In the example illustrated in FIG. 2, since a facility or a building stands between the vehicle 100 and a pedestrian, neither a driver of the vehicle 100 nor the pedestrian becomes aware of each other.

In such an environment, if the pedestrian terminal 500 receives vehicle information from the onboard device 150, it is easier to avoid a traffic accident on a sudden encounter. The vehicle information includes the geographical location (such as latitude and longitude) of the vehicle. The vehicle information may also include the travelling speed of the vehicle.

Similarly, if the onboard device 150 receives pedestrian information from the pedestrian terminal 500, it is easier to avoid a traffic accident on a sudden encounter. The pedestrian information includes the geographical position (such as latitude and longitude) of the pedestrian. The pedestrian information may also include the travelling speed of the pedestrian.

According to the present embodiment, the roadside device 200 is available for the plurality of radio communication schemes: the roadside device 200 performs both the vehicle communication and the pedestrian communication. The roadside device 200 transfers (redistributes) information between the pedestrian terminal 500 and the onboard device 150 by the plurality of radio communication schemes.

Accordingly, the pedestrian terminal 500 and the onboard device 150 transmit and receive information via the roadside device 200, which makes it possible to easily avoid a traffic accident between the pedestrian and the vehicle 100.

Example of Architecture of Roadside Device

Figure 3:
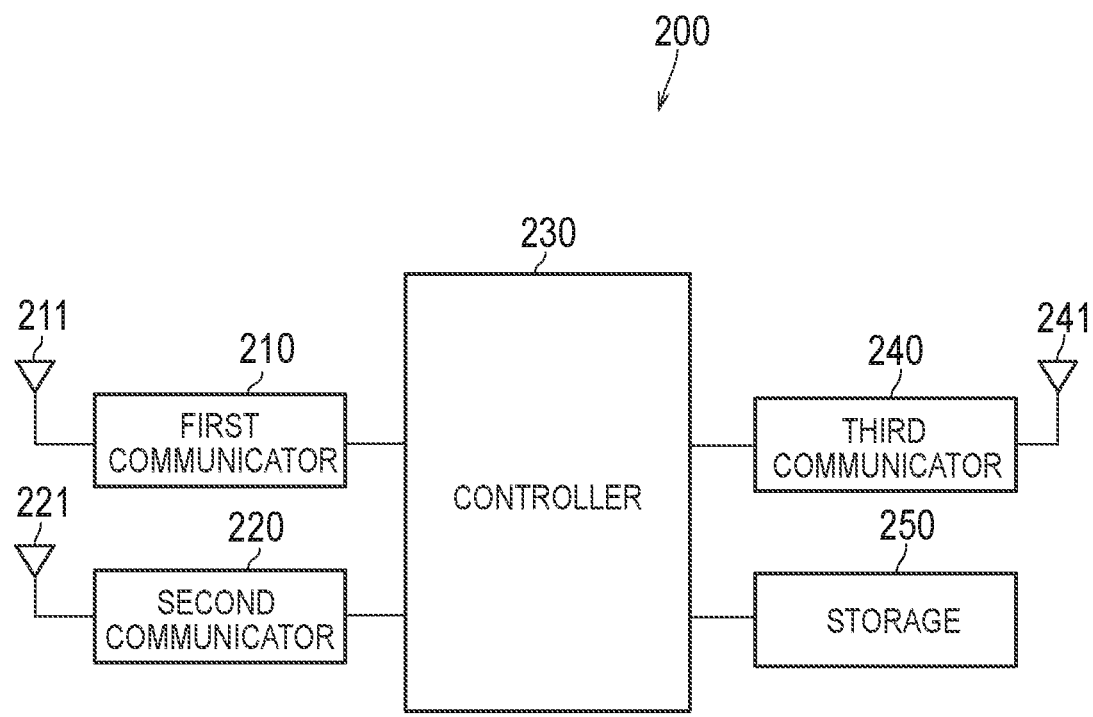
FIG. 3 illustrates an example of architecture of a roadside device according to the embodiment.

FIG. 3 illustrates an example of architecture of the roadside device 200 according to this embodiment. As illustrated in FIG. 3, the roadside device 200 includes a first communicator 210, a second communicator 220, a controller 230, a third communicator 240, and a storage 250.

The first radio communicator 210 is available for the first radio communication scheme and performs radio communication using the first radio communication scheme. The first radio communicator 210 converts the radio signal received by the antenna 211 under control of the controller 230 into a baseband signal (received signal), and outputs it to the controller 230. The first radio communicator 210 converts the baseband signal (transmitting signal) output from the controller 230 into the radio signal, and transmits it from the antenna 211 under control of the controller 230.

The second radio communicator 220 is available for the second radio communication scheme which is different from the first radio communication scheme and performs radio communication using the second radio communication scheme. The second radio communicator 220 converts the radio signal received by the antenna 221 under control of the controller 230 into a baseband signal (received signal), and outputs it to the controller 230. The second radio communicator 220 converts the baseband signal (transmitting signal) output from the controller 230 into the radio signal, and transmits it from the antenna 221 under control of the controller 230.

The controller 230 includes at least one processor. The processor may include a baseband processor and a CPU. The baseband processor performs modulation/demodulation, encoding/decoding, and the like of the baseband signal. The CPU performs a variety of processing by executing programs stored in the storage 250.

The controller 230 acquires information associated with a first mobile station from the first mobile station via the first communicator 210 and distributes the acquired information to a second mobile station via the second communicator 220. In other words, the controller 230 acquires information associated with the first mobile station from the first mobile station by a first radio communication scheme and distributes the acquired information to the second mobile station by a second radio communication scheme different from the first radio communication scheme.

According to the present embodiment, one of the first mobile station and the second mobile station is the onboard device 150 mounted on the vehicle 100 and the other is the pedestrian terminal 500 that moves together with the pedestrian.

Firstly, when vehicle information is transmitted from the onboard device 150 to the pedestrian terminal 500 via the roadside device 200, the onboard device 150 corresponds to the first mobile station and the pedestrian terminal 500 corresponds to the second mobile station. In this case, the first radio communication scheme is for the vehicle communication (for example, ARIB STD-T109, DSRC, and C-V2X), and the second radio communication scheme is for the pedestrian communication (for example, Bluetooth (registered trademark) and WLAN). The controller 230 may broadcast the acquired vehicle information to the second mobile station (pedestrian terminal 500) via the second communicator 220.

Secondly, when pedestrian information is transmitted from the pedestrian terminal 500 to the onboard device 150 via the roadside device 200, the pedestrian terminal 500 corresponds to the first mobile station and the onboard device 150 corresponds to the second mobile station. In this case, the first radio communication scheme is for the pedestrian communication (for example, Bluetooth (registered trademark) and WLAN), and the second radio communication scheme is for the vehicle communication (for example, ARIB STD-T109, DSRC, and C-V2X). The controller 230 may broadcast the acquired pedestrian information to the second mobile station (onboard device 150) via the second communicator 220.

The third communicator 240 communicates with the central apparatus 400 and/or a roadside equipment under the control of the controller 230. The roadside equipment represents an equipment on a road or a roadside and includes, for example, at least one of traffic light 300, pedestrian sensor, and roadside sensor. The third communicator 240 may perform cable communication or radio communication with the central apparatus 400 and/or the roadside equipment.

The controller 230 acquires road information from the central apparatus 400 and/or the roadside equipment via the third communicator 240. The controller 230 may acquire pedestrian information via the third communicator 240 from a type of roadside equipment, a pedestrian sensor. The controller 230 may acquire vehicle information via the third communicator 240 from a type of roadside equipment, a roadside sensor.

The controller 230 extracts a part of information from the acquired information (vehicle information, pedestrian information, road information) and distributes the extracted information to the second mobile station via the second communicator 220. The controller 230 may change information to be extracted depending on whether the second mobile station is the onboard device 150 or the pedestrian terminal 500. In other words, the controller 230 may change the priority rankings of information to be distributed depending on the delivery destination.

For example, the storage 250 preliminarily stores an information distribution priority ranking table that indicates priority rankings of information to be distributed, and the controller 230 determines a priority ranking based on the information distribution priority ranking table and distributes information based on the determined priority ranking. This makes it easier to preferentially distribute information useful for the delivery destination. A specific example of the information distribution priority ranking table will be described later.

When the acquired information (vehicle information, pedestrian information, road information) has a larger volume than information transmittable by the second communicator 220, the controller 230 extracts information with a volume equal to or less than the volume of the information transmittable by the second communicator 220. The volume of the information transmittable by the second communicator 220 may be determined according to the maximum volume of the transmittable information or the maximum transmission speed defined by the second radio communication scheme. Alternatively, the volume of the transmittable information may be determined according to the measured value of the transmission speed.

The controller 230 may periodically distribute information to the second mobile station. The controller 230 may distribute information acquired between the previous distribution time and the current distribution time to the second mobile station at the current distribution time. This facilitates low-delay information distribution.

The third communicator 240 may include a radio communicator available for a third radio communication scheme different from the first and second radio communication schemes. Under the control of the controller 230, the third communicator 240 may convert a radio signal received by an antenna 241 into a baseband signal (reception signal) and output the baseband signal to the controller 230. Under the control of the controller 230, the third communicator 240 may convert a baseband signal (transmission signal) output by the controller 230 into a radio signal and transmit the radio signal from the antenna 241.

The third radio communication scheme is a wide area communication scheme such as long term evolution (LTE). The controller 230 may distribute the acquired information (vehicle information, pedestrian information, road information) to the central apparatus 400 via the third communicator 240 (wide area communication scheme). The central apparatus 400 redistributes the information acquired from the roadside device 200 to a remote location.

The controller 230 may extract a part of information from the acquired information and distribute the extracted information to the central apparatus 400 via the third communicator 240. For example, the controller 230 determines a priority ranking of information to be distributed to the central apparatus 400 based on the information distribution priority ranking table stored by the storage 250 and distributes information based on the determined priority ranking.

When the acquired information (vehicle information, pedestrian information, road information) has a larger volume than information transmittable by the third communicator 240, the controller 230 extracts information with a volume equal to or less than the volume of the information transmittable by the third communicator 240. The volume of the information transmittable by the third communicator 240 may be determined according to the maximum volume of the transmittable information or the maximum transmission speed defined by the third radio communication scheme. Alternatively, the volume of the transmittable information may be determined according to the measured value of the transmission speed.

The storage 250 includes at least one memory. The storage 250 stores a program executed by the controller 230 and information used for processing by the controller 230. The storage 250 stores the information distribution priority ranking table.

Example of Information Distribution Priority Ranking Table

The information distribution priority ranking table is used for setting the priority rankings of contents of information to be distributed for each radio communication scheme and usage. The controller 230 switches contents of information to be distributed based on the information distribution priority ranking table.

Hereinafter, the first radio communication scheme represents as a pedestrian communication scheme, the second radio communication scheme represents as a vehicle communication scheme, and the third radio communication scheme represents as a wide area communication scheme. Typical examples of the pedestrian communication scheme, the vehicle communication scheme, and the wide area communication scheme include Bluetooth (registered trademark) Low Energy (BLE), ARIB STD-T109 (hereinafter abbreviated as "T109"), and LTE, respectively.

FIG. 4 illustrates an example of the information distribution priority ranking table stored in the storage 250.

As illustrated in FIG. 4, the distribution information is classified into "low-risk pedestrian information (pedestrians at short range)," "high-risk pedestrian information (pedestrians at long range)," "high-risk vehicle information (vehicles at short range or vehicles moving at high speed)," "low-risk vehicle information (vehicles at long range, parked vehicles or the like)," "dynamic road information (signal information or the like)," "quasi-dynamic road information (construction information or the like)," and "static road information (road shapes or the like)."

For each of the pedestrian communication scheme (BLE), the vehicle communication scheme (T109), and the wide area communication scheme (LTE), the information distribution priority ranking table determines a priority ranking per distribution information.

Herein, the "low-risk pedestrian information (pedestrians at short range)" is associated with pedestrians close to dangerous areas such as intersections or corners. The "high-risk pedestrian information (pedestrians at long range)" is associated with pedestrians far from such dangerous areas.

In addition, "high-risk vehicle information (vehicles at short range or vehicles moving at high speed)" is associated with vehicles close to the dangerous areas or vehicles moving at high speed. The "low-risk vehicle information (vehicles at long range, parked vehicles or the like)" is associated with vehicles far from the dangerous areas or vehicles that are parked or moving at low speed.

The "dynamic road information (signal information or the like)" changes dynamically such as information for switching light colors of the traffic light 300. The "quasi-dynamic road information (construction information or the like)" changes quasi-dynamically such as information on road construction. The "static road information (road shapes or the like)" is static such as road shapes and road signs.

The controller 230 acquires pedestrian information by the pedestrian communication scheme (BLE) and, as illustrated in FIG. 4, determines that delivery destinations who require the pedestrian information are vehicles (in order to avoid accidents with pedestrians). For this reason, the pedestrian information is given the highest priority for distribution by the vehicle communication scheme (T109).

As illustrated in FIG. 4, the controller 230 determines that information required by pedestrians is vehicle information and that information associated with moving vehicles deserves higher priority (in order to avoid accidents with moving vehicles). For this reason, the vehicle information, particularly, the information on moving vehicles, is given the highest priority for distribution by the pedestrian communication scheme (BLE). However, when there are no vehicles around pedestrians, the pedestrian communication scheme (BLE) distributes the dynamic road information (signal information).

As illustrated in FIG. 4, when the controller 230 transfers information from the roadside device 200 to the central apparatus 400 by the wide area communication scheme (LTE) and redistributed the information to remote locations, the controller 230 determines that information changing in short times is unnecessary (for example, when there are moving vehicles). On the other hand, the quasi-dynamic information such as vehicles in an accident or facilities under construction is effective in avoiding traffic congestion, and the quasi-dynamic information is given the highest priority.

As described above, the controller 230 prioritizes and distributes needed information according to the radio communication scheme and usage.

Furthermore, as far as the communication band allows, it is possible to distribute a plurality of pieces of information. For example, in a case where the vehicle communication scheme (T109) allows the distribution of three types of information, "high-risk pedestrian information (pedestrians at long range)," "high-risk vehicle information (vehicles at short range or vehicles moving at high speed)," and "dynamic road information (signal information or the like)" are to be distributed.

Operation Example of System

FIG. 5 illustrates an overall operation example of the traffic communication system 1 according to this embodiment. The operation illustrated in FIG. 5 may be executed periodically.

As illustrated in FIG. 5, in Step S1, the central apparatus 400 transmits the road information to the roadside device 200. To the roadside device 200, the central apparatus 400 transmits, for example, "dynamic road information (signal information or the like)," "quasi-dynamic road information (construction information or the like)," and "static road information (road shapes or the like)."

In Step S2, a roadside equipment 600 transmits road information and the like to the roadside device 200. For example, the traffic light 300 included in the roadside equipment 600 may transmit "dynamic road information (signal information or the like)" to the roadside device 200.

A pedestrian sensor included in the roadside equipment 600 may transmit pedestrian information to the roadside device 200. A roadside sensor included in the roadside equipment 600 may transmit vehicle information to the roadside device 200.

In Step S3, the pedestrian terminal 500 transmits pedestrian information to the roadside device 200 by the pedestrian communication scheme.

In Step S4, the onboard device 150 transmits vehicle information to the roadside device 200 by the vehicle communication scheme.

In steps S1 to S4, the roadside device 200 (controller 230) acquires the vehicle information, the pedestrian information, and the road information. Steps S1 to S4 are not necessarily performed in this order and may be performed in any order.

In Step S5, the roadside device 200 (controller 230) refers to the information distribution priority ranking table. From the information acquired in Steps S1 to S4, the roadside device 200 extracts information to be distributed for each delivery destination of the information (pedestrian terminal 500, onboard device 150, central apparatus 400) according to the priority ranking.

Hereinafter, the information extracted for the pedestrian terminal 500 is referred to as "distribution information 1," the information extracted for the onboard device 150 is referred to as "distribution information 2," and the information extracted for the central apparatus 400 is referred to as "distribution information 3."

In Step S6, the roadside device 200 (controller 230) distributes the distribution information 1 to the pedestrian terminal 500 by the pedestrian communication scheme.

In Step S7, the roadside device 200 (controller 230) distributes the distribution information 2 to the onboard device 150 by the vehicle communication scheme.

In Step S8, the roadside device 200 (controller 230) distributes the distribution information 3 to the central apparatus 400 by the wide area communication scheme.

Steps S6 to S8 are not necessarily performed in this order and may be performed in any order.

Other Embodiments

The aforementioned embodiment does not particularly mention about a case where the onboard device 150 is available for the pedestrian communication scheme. When the onboard device 150 is available for the pedestrian communication scheme, the roadside device 200 (controller 230) may distribute information to the onboard device 150 via the first communicator 210 (by the pedestrian communication scheme) and, at the same time, distribute the acquired information to the onboard device 150 via the second communicator 220 (by the vehicle communication scheme). In this manner, parallel distribution of information by a plurality of radio communication schemes enhances the reliability of communication because even though one communication path causes an error, the information can be acquired through another communication path.

Furthermore, in the aforementioned embodiment, the roadside device 200 is illustrated as an all-in-one unit including an antenna and a main body, but the roadside device 200 may be a device having an antenna and a main body separated. In regard to the roadside device with the separated antenna and main body, the antenna may be installed around a road and the main body may be installed away from the road. Alternatively, the antenna and the main body may be connected via a cable.

Though it is described with reference to the drawings about the embodiments in details, concrete configuration is not limited to the above, various design changes or the like are possible without deviating from the gist of the invention.

The invention claimed is:

1. A base station configured to perform radio communication with a mobile station on a road in a traffic communication system, the base station comprising:
   a first communicator configured to perform radio communication using a first radio communication scheme;
   a second communicator configured to perform radio communication using a second radio communication scheme different from the first radio communication scheme;
   a controller configured to:
      acquire, from the first mobile station via the first communicator using the first radio communication scheme, information associated with a first mobile station, the information including at least one of vehicle information and pedestrian information; and
      distribute the acquired information including at least one of the vehicle information and the pedestrian information to a second mobile station via the second communicator using the second communication scheme; and
   a storage configured to store priority rankings of distribution information each corresponding to radio communication schemes, wherein
   the controller is configured to
      determine a priority ranking of distribution information corresponding to the second communication scheme among from the stored priority rankings, and
      extract, from the acquired information based on the determined priority ranking corresponding to the second communication scheme, information to be distributed to the second mobile station via the second communicator using the second communication scheme.

2. The base station according to claim 1,
   wherein one of the first mobile station and the second mobile station is an onboard device installed on a vehicle and the other is a moving person terminal which moves together with a moving person.

3. The base station according to claim 1,
   wherein the controller is configured to broadcast the acquired information to the second mobile station via the second communicator.

4. The base station according to claim 1,
   wherein the controller is configured to acquire, from roadside equipment and/or a central apparatus, information associated with the road, and
   the controller is configured to extract a part of information from the acquired information and distribute the extracted information to the second mobile station via the second communicator.

5. The base station according to claim 4,
   wherein, when the acquired information has a larger volume than information transmittable by the second communicator, the controller extracts information with a volume equal to or less than the volume of the information transmittable by the second communicator.

6. The base station according to claim 4,
   wherein the controller is configured to change the extracted information to be extracted in response to whether the second mobile station is an onboard device or a moving person terminal.

7. The base station according to claim 1,
wherein the controller is configured to periodically distribute information to the second mobile station, and
the controller is configured to distribute, to the second mobile station at a current distribution time, information acquired between a previous distribution time and the current distribution time.

8. The base station according to claim 1,
wherein the controller is configured to distribute the acquired information to the second mobile station via the first communicator and distributes the acquired information to the second mobile station via the second communicator.

9. The base station according to claim 1, further comprising:
a third communicator available for a third radio communication scheme different from the first radio communication scheme and the second radio communication scheme,
wherein the controller is configured to extract a part of information from the acquired information and distribute the extracted information to a central apparatus via the third communicator.

10. The base station according to claim 1, further comprising:
a storage configured to store priority rankings of distribution information for each of radio communication schemes,
wherein the controller is configured to determine a priority ranking according to the second communication scheme and extract information to be distributed to the second mobile station from the acquired information based on the determined priority ranking.

11. A traffic communication system comprising the base station according to claim 1.

12. A method for controlling a base station which performs radio communication with a mobile station on a road in a traffic communication system, the method comprising:

acquiring, from a first mobile station using a first radio communication scheme, information associated with the first mobile station, the information including at least one of vehicle information and pedestrian information;

distributing the acquired information including at least one of the vehicle information and the pedestrian information to a second mobile station using a second radio communication scheme different from the first radio communication scheme;

storing priority rankings of distribution information each corresponding to radio communication schemes;

determining a priority ranking of distribution information corresponding to the second communication scheme among from the stored priority rankings; and extracting, from the acquired information based on the determined priority ranking corresponding to the second communication scheme, information to be distributed to the second mobile station via the second communicator using the second communication scheme.

13. The base station according to claim 10, further comprising:
when the second radio communication scheme is vehicle communication scheme, the controller is configured to determine that the pedestrian information is highest priority for distribution by the second radio communication scheme in the priority ranking.

14. The base station according to claim 10, further comprising:
when the second radio communication scheme is pedestrian communication scheme, the controller is configured to determine that the vehicle information is highest priority for distribution by the second radio communication scheme in the priority ranking.

* * * * *